United States Patent
Puggelli et al.

(10) Patent No.: US 11,431,249 B2
(45) Date of Patent: Aug. 30, 2022

(54) NEGATIVE SLEW RATE CONTROL FOR POWER CONVERTERS

(71) Applicant: Apple Inc., Cupertino, CA (US)

(72) Inventors: Alberto Alessandro Angelo Puggelli, Cupertino, CA (US); Ofir Gilad, Berlin (DE); Floyd L. Dankert, Austin, TX (US); Hubert Attah, Santa Clara, CA (US); Sanjay Pant, Santa Clara, CA (US); Shawn Searles, Austin, TX (US); Georg Diebel, Ebenhausen (DE)

(73) Assignee: Apple Inc., Cupertino, CA (US)

( * ) Notice: Subject to any disclaimer, the term of this patent is extended or adjusted under 35 U.S.C. 154(b) by 127 days.

(21) Appl. No.: 17/005,129

(22) Filed: Aug. 27, 2020

(65) Prior Publication Data
US 2022/0069704 A1 Mar. 3, 2022

(51) Int. Cl.
*H02M 3/158* (2006.01)
*H02M 1/08* (2006.01)
*H02M 1/00* (2006.01)

(52) U.S. Cl.
CPC ......... *H02M 3/158* (2013.01); *H02M 1/0025* (2021.05); *H02M 1/08* (2013.01); *H02M 1/0009* (2021.05)

(58) Field of Classification Search
CPC ...... H02M 3/158; H02M 1/0025; H02M 1/08; H02M 1/0009
See application file for complete search history.

(56) References Cited

U.S. PATENT DOCUMENTS

| 6,025,704 A * | 2/2000 | Elliott ..................... G05F 1/569 323/280 |
| 7,365,661 B2 | 4/2008 | Thomas |
| 10,122,168 B2 | 11/2018 | Goncalves et al. |
| 2005/0242668 A1* | 11/2005 | Cividino ................. H02J 1/102 307/58 |
| 2011/0204859 A1* | 8/2011 | Prodic ................. H02M 3/1588 323/271 |
| 2017/0085183 A1 | 3/2017 | Notsch |

FOREIGN PATENT DOCUMENTS

EP          0940061 B1     7/2006

* cited by examiner

*Primary Examiner* — Kyle J Moody
*Assistant Examiner* — Jye-June Lee
(74) *Attorney, Agent, or Firm* — Kowert, Hood, Munyon, Rankin & Goetzel, P.C.; Dean M. Munyon (57) ABSTRACT

A power converter circuit that includes a switch node coupled to a regulated power supply node via an inductor is configured to regulate a voltage level of a power supply node using a particular one of multiple available operating modes. In response to receiving a command to reduce the voltage level of the power supply node, the power converter circuit begins to reduce the voltage level of the power supply node, while autonomously selecting different ones of available operating modes. The power converter circuit may compare to the voltage level of the power supply node to boundary levels and select a different operating mode when the voltage level of the power supply node exceeds one of the boundaries. By switching operating modes during the negative slew of the voltage level of the power supply node, the power converter may maintain a target efficiency during the reduction in voltage.

20 Claims, 8 Drawing Sheets

NEGATIVE SLEW RATE CONTROL FOR POWER CONVERTERS

BACKGROUND

Technical Field

Embodiments described herein relate to integrated circuits, and more particularly, to techniques for generating regulated power supply voltages.

Description of the Related Art

Modern computer systems may include multiple circuits blocks designed to perform various functions. For example, such circuit blocks may include processors, processor cores configured to execute software or program instructions. Additionally, the circuit blocks may include memory circuits, mixed-signal or analog circuits, and the like.

In some computer systems, the circuit blocks may be designed to operate at different power supply voltage levels. Power management circuits may be included in such computer systems to generate and monitor varying power supply voltage levels for the different circuit blocks.

Power management circuits often include one or more power converter circuits configured to generate regulator voltage levels on respective power supply signals using a voltage level of an input power supply signal. Such regulator circuits may employ multiple passive circuit elements, such as inductors, capacitors, and the like.

SUMMARY OF THE EMBODIMENTS

Various embodiments of a power converter circuit are disclosed. Broadly speaking, a power converter circuit is contemplated that autonomously determines an operating mode during a reduction in a regulation target of its output voltage. The power converter circuit includes a switching circuit, which, in turn, includes a switch node coupled to a regulated power supply node via an inductor. The switching circuit is configured to source charge to the switch node when activated. The power converter circuit also includes a control circuit configured to activate the switch circuit based on a reference voltage and a current operating mode that is a particular one of a plurality of operating modes. In response to receiving a change command to reduce a voltage level of the regulated power supply node to a new voltage level, the control circuit is configured to initiate a change in the reference voltage level. In order to autonomously determine the operating mode, the control circuit is configured to monitor a slew rate of the voltage level of the regulated power supply node, and change, based on the slew rate, the current operating mode to a different operating mode of the plurality of operating modes. By selecting the different operating mode as the current operating mode, the control circuit may allow the power converter circuit to meet specified efficiency goals, as well as allow for the power converter circuit to transition the voltage level of power supply node to the new voltage level in a specified time period.

BRIEF DESCRIPTION OF THE DRAWINGS

The following detailed description makes reference to the accompanying drawings, which are now briefly described.

While the disclosure is susceptible to various modifications and alternative forms, specific embodiments thereof are shown by way of example in the drawings and will herein be described in detail. It should be understood, however, that the drawings and detailed description thereto are not intended to limit the disclosure to the particular form illustrated, but on the contrary, the intention is to cover all modifications, equivalents and alternatives falling within the spirit and scope of the present disclosure as defined by the appended claims. The headings used herein are for organizational purposes only and are not meant to be used to limit the scope of the description. As used throughout this application, the word "may" is used in a permissive sense (i.e., meaning having the potential to), rather than the mandatory sense (i.e., meaning must). Similarly, the words "include," "including," and "includes" mean including, but not limited to.

Various units, circuits, or other components may be described as "configured to" perform a task or tasks. In such contexts, "configured to" is a broad recitation of structure generally meaning "having circuitry that" performs the task or tasks during operation. As such, the unit/circuit/component can be configured to perform the task even when the unit/circuit/component is not currently on. In general, the circuitry that forms the structure corresponding to "configured to" may include hardware circuits. Similarly, various units/circuits/components may be described as performing a task or tasks, for convenience in the description. Such descriptions should be interpreted as including the phrase "configured to." Reciting a unit/circuit/component that is configured to perform one or more tasks is expressly intended not to invoke 35 U.S.C. § 112, paragraph (f) interpretation for that unit/circuit/component. More generally, the recitation of any element is expressly intended not to invoke 35 U.S.C. § 112, paragraph (f) interpretation for that element unless the language "means for" or "step for" is specifically recited.

As used herein, the term "based on" is used to describe one or more factors that affect a determination. This term does not foreclose the possibility that additional factors may affect the determination. That is, a determination may be solely based on specified factors or based on the specified factors as well as other, unspecified factors. Consider the phrase "determine A based on B." This phrase specifies that B is a factor that is used to determine A or that affects the determination of A. This phrase does not foreclose that the determination of A may also be based on some other factor, such as C. This phrase is also intended to cover an embodiment in which A is determined based solely on B. The phrase "based on" is thus synonymous with the phrase "based at least in part on."

DETAILED DESCRIPTION OF EMBODIMENTS

Computer systems may include multiple circuit blocks configured to perform specific functions. Such circuit blocks may be fabricated on a common substrate and may employ different power supply voltage levels. Power management units (commonly referred to as "PMUs") may include multiple power converter circuits configured to generate regulated voltage levels for various power supply signals. Such power converter circuits may employ a regulator circuit that includes both passive circuit elements (e.g., inductors, capacitors, etc.) as well as active circuit elements (e.g., transistors, diodes, etc.).

Different types of voltage regulator circuits may be employed based on power requirements of load circuits, available circuit area, and the like. One type of commonly used voltage regulator circuit is a buck converter circuit. Such converter circuits include multiple switches (also referred to as "power switches") and a switch node that is coupled to a regulated power supply node via an inductor. One switch is coupled between an input power supply node and the switch node, and is referred to as the "high-side switch." Another switch is coupled between the switch node and a ground supply node, and is referred to as the "low-side switch."

When the high-side switch is closed (referred to as an "on-time"), energy is applied to the inductor, allow the current through the inductor to increase. During this time, the inductor stores energy in the form of a magnetic field. When the high-side switch is opened and the low-side switch is closed (referred to as an "off-time"), energy is no longer being applied to the inductor, and the voltage across the inductor reverses, which results in the inductor functioning as a current source, with the energy stored in the inductor's magnetic field supporting the current flowing into the load. The process of closing and opening the high-side and low-side switches is performed periodically to maintain a desired voltage level on power supply node.

Power converter circuits employ different operating modes to determine periodicity and duration of on-times and off-times. As used and described herein, an operating mode refers to a particular method for determining respective frequencies and durations for on-times and off-time of a power converter circuit. For example, a power converter circuit may use pulse frequency modulation operating mode that employs a fixed on-time and a variable off-time to adjust the frequency with which on-times occurs. Alternatively, the power converter circuit may use pulse frequency modulation that employs a fixed off-time, and a variable on-time to adjust the operating frequency. Power converter circuits may also employ pulse width modulation which uses a fixed frequency of operation but varies respective durations of on-times and off-times by comparing a current through the power converter circuit's inductor to either a maximum current value (referred to as "peak regulation") or a minimum current value (referred to as "valley regulation"). A power converter circuit may be designed to operate in several operating modes depending on various factors (e.g., load current).

During operation of a computer system voltage levels for various power supply nodes may be changed to regulate power consumption, vary performance, etc. For example, in some cases, the voltage level of a power supply node coupled to a functional circuit block may be decreased, in response to a determination that the functional circuit block is currently not being used. In such cases, a power converter circuit generating the voltage level on the power supply node must decrease the voltage level of the power supply node in a specified period of time, while maintaining regulation. The decrease in the voltage level of the power supply node may be referred to as a "negative slew."

Some power converters may switch operating modes in order to compensate for changes in load current. During a negative slew of the voltage level of a power supply node, however, power converter circuits maintain the operating mode in which they are currently operating. When a power converter performs a negative slew with a fixed operating mode, various parameters (e.g., the starting voltage and final voltage of a negative slew, capacitive load, etc.) can lead to inefficiencies in the power converter causing the power converter to dissipate extra power and/or not being able to perform the negative slew as requested. The inventors realized that by enabling a power converter circuit to autonomously change its operating mode during a negative slew of its regulated output voltage, the power converter circuit can determine an operating mode that meets efficiency targets, as well as allow the power converter to meet the targets for the negative slew.

The embodiments illustrated in the drawings and described below may provide techniques for a power converter to autonomously change its operating mode while performing a negative slew in order to meet the voltage and time targets of the negative slew, while maintaining efficiency targets.

Figure 1:
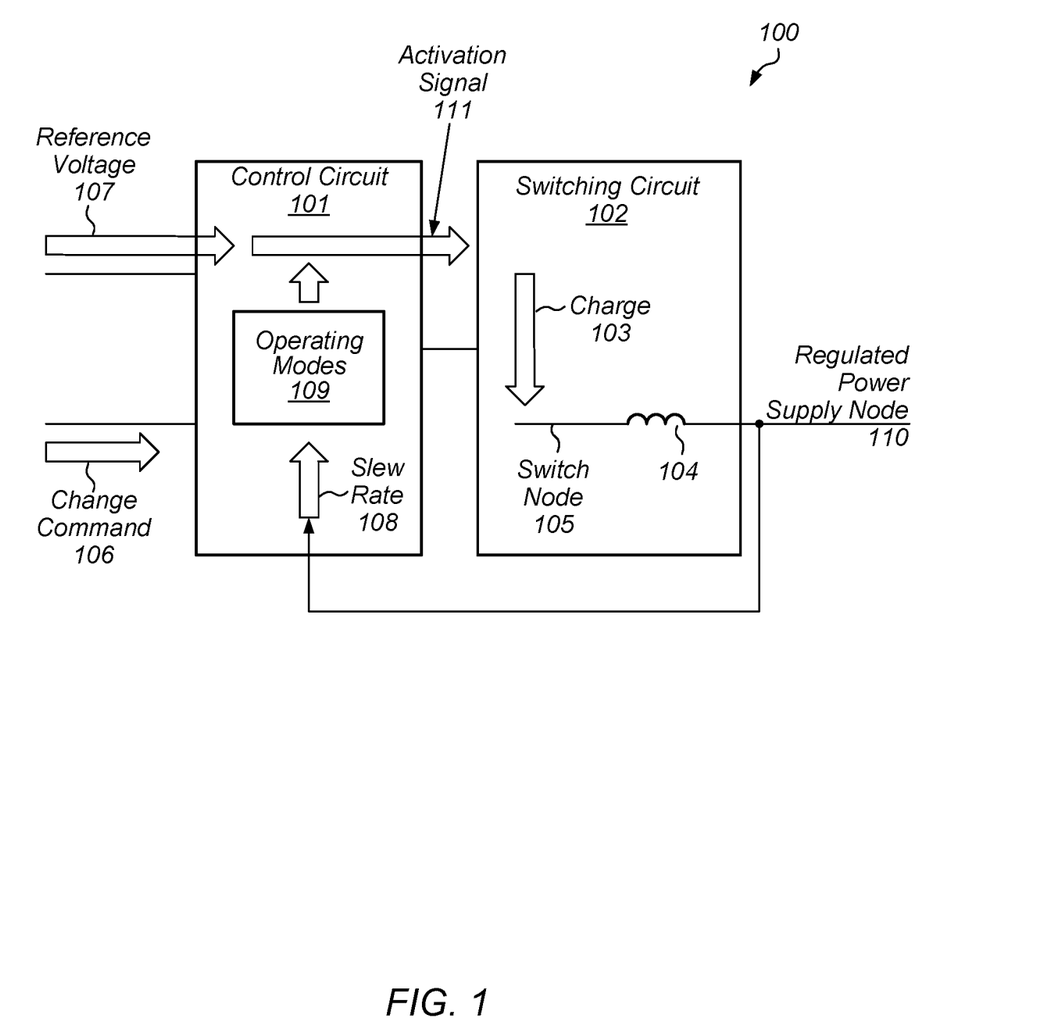
FIG. 1 illustrates a block diagram of an embodiment of a power converter circuit.

A block diagram depicting an embodiment of a power converter circuit is illustrated in FIG. 1. As illustrated, power converter circuit 100 includes control circuit 101 and switching circuit 102. Although a single switching circuit is depicted in the embodiment of FIG. 1, in other embodiments, multiple switching circuits (collectively "phase units" or "phase circuits") may be coupled, in parallel, to regulated power supply node 110. Such phase circuits may be operated in parallel with each other, or they may be operated out of phase with each other.

Switching circuit 102 includes switch node 105 coupled to regulated power supply node 110 via inductor 104. In various embodiments, switching circuit 102 is configured to source charge 103 to switch node 105 when activated. Is it noted that an activation of switching circuit 102 may correspond to an on-time of power converter circuit 100. As used herein, to source (or "sourcing") charge (or current) to a particular circuit node refers to allowing charge (or current) to flow from a different circuit node to the particular circuit node, where the voltage level of the different circuit node is greater than the voltage level of the particular circuit node.

Control circuit 101 is configured to activate, using activation signal 112, switching circuit 102 based on a current operating mode and reference voltage 107, where the current operating mode is a particular one of operating modes 109. In various embodiments, the particular operating mode may have been determined based on a load current being drawn from regulated power supply node 110, or any other suitable characteristic. As described below, control circuit 101 may generate activation signal using reference voltage level 107 as well as a current flowing through inductor 104.

Control circuit 101 is configured, in response to receiving change command 106, to initiate a change in reference voltage 107. In various embodiments, change command 106 specifies the performance of a negative slew of the voltage level of regulated power supply node 110, and includes information indicative of a new target voltage level for regulated power supply node 110. Change command 106 may also include information indicative of a time period for the voltage level of regulated power supply node 110 to transition from a current voltage level to the new voltage level. It is noted that the new voltage level is less than the current voltage level.

In order to autonomously determine an operating mode during a negative slew of the voltage level of regulated power supply node 110, control circuit 101 is configured to monitor slew rate 108 of the voltage level of regulated power supply node 110, and change, based on slew rate 108, the current operating mode to a different operating mode of operating modes 109. By selecting the different operating mode as the current operating mode, control circuit 101 may allow an efficiency of power converter circuit 100 to meet specified limits, as well as allow for power converter circuit 100 to transition the voltage level of regulated power supply node 110 to the new voltage level in the time period specified by change command 106.

Figure 2:
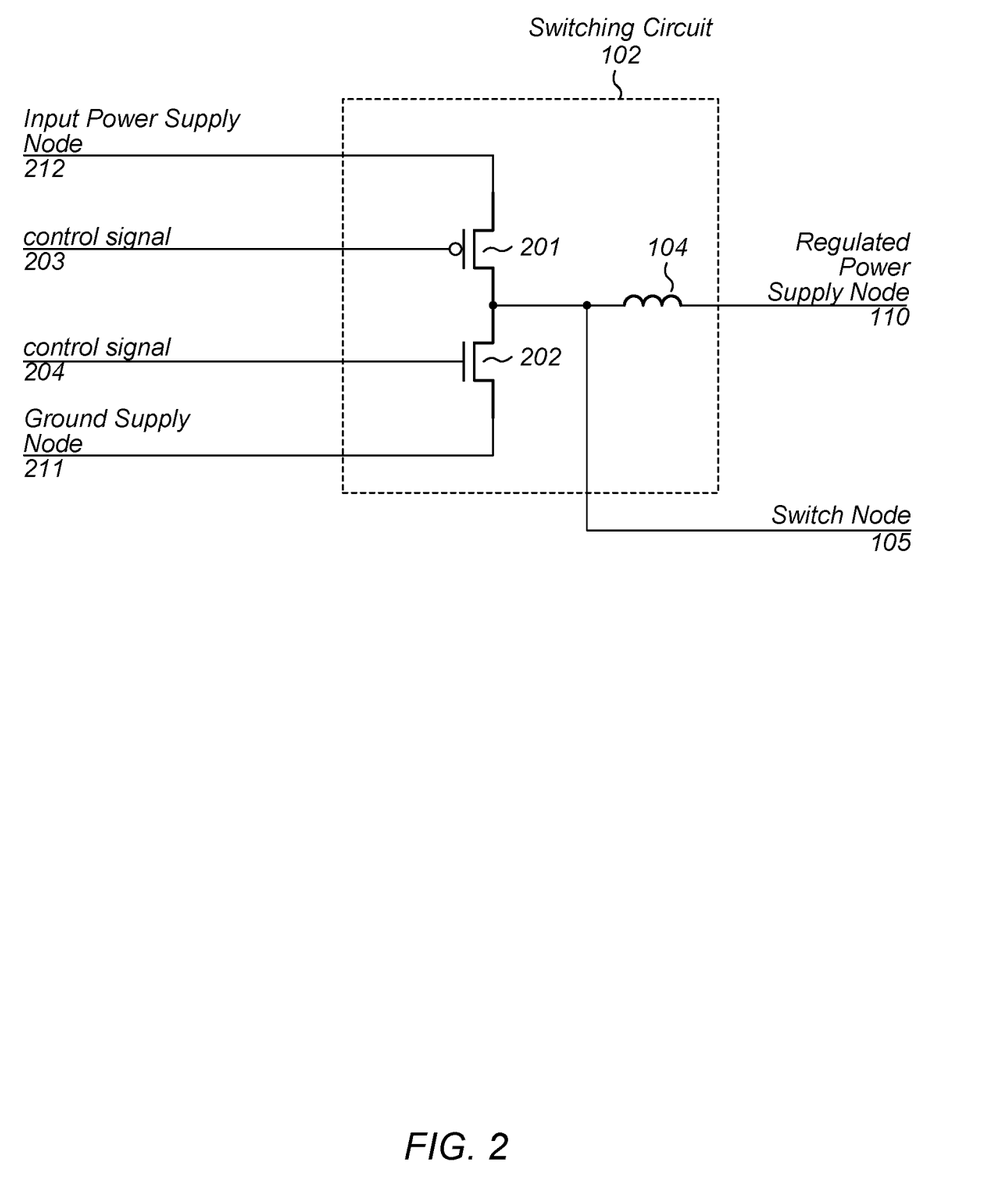
FIG. 2 illustrates schematic diagram of an embodiment of a regulator circuit.

A schematic diagram of switching circuit 102 is depicted in FIG. 2. As illustrated, switch circuit 102 includes devices 201 and 202, which are both coupled to switch node 105, and controlled by control signals 203 and 204, respectively.

Device 201 (also referred to as a "high-side switch") is coupled between input power supply node 212 and switch node 105, and is configured, based on control signal 203, to selectively couple input power supply node 212 to switch node 105. For example, during an on-time of power converter circuit 100, control signal 203 is asserted, which activates device 201 and couples input power supply node 212 to switch node 105, thereby charging switch node 105 by allowing a current to flow from input power supply node 212 to switch node 105, and then into regulated power supply node 110 via inductor 104. As the current flows to into regulated power supply node 110, inductor 104 stores energy in the form of a magnetic field. As described below, the energy stored in the magnetic field may allow current to continue to flow into regulated power supply node 110 while power converter circuit 100 is operating in an off-state.

Device 202 (also referred to as a "low side switch") is coupled between switch node 105 and ground supply node 211, and is controlled by control signal 204. When power converter circuit 100 is operating in an off-state, control signal 203 is de-asserted and control signal 204 is asserted, which de-activates device 201 and activates device 202, coupling switch node 105 to ground supply node 111. With switch node 105 coupled to ground supply node 211, energy is no longer being applied to inductor 104 and the voltage across inductor 104 reverses polarity, causing inductor 104 to function as a current source. The magnetic field of inductor 104 supports the current flowing into regulated power supply node thereby providing a conduction path from regulated power supply node 110 through inductor 104 into ground supply node 211.

Device 201 and device 202 may be embodiments of MOSFETs. In particular, device 201 may be a particular embodiment of a p-channel MOSFET and device 202 may be a particular embodiment of an n-channel MOSFET. Although only two devices are depicted in the embodiment of FIG. 2, in other embodiments, any suitable number of devices, coupled in series or parallel, may be employed to achieve particular electrical characteristics (e.g., on-resistance of the devices).

As used herein, asserting, or an assertion of, a signal refers to setting the signal to a particular voltage level that activates a circuit or device coupled to the signal. The particular voltage level may be any suitable value. For example, in the case where device 201 is p-channel MOSFET, asserting control signal 203 may set control signal 203 to a voltage level at or near ground potential. In a similar fashion, de-asserting, or a de-assertion of, a signal refers to setting the signal to a particular voltage level that de-activates a circuit or device coupled to the signal. For example, in the case where device 202 is an n-channel MOSFET, de-asserting control signal 204 may set control signal 204 to a voltage level at or near ground potential.

As described below, control circuit 101 is configured to generate control signals 203 and 204. In various embodiments, control circuit 101 may alternate between an on-state and an off-state, in order to maintain a desired voltage level on regulated power supply node 110. The duration of the on-state and the off-state may be based on a current operating mode of operating modes 109.

Figure 3:
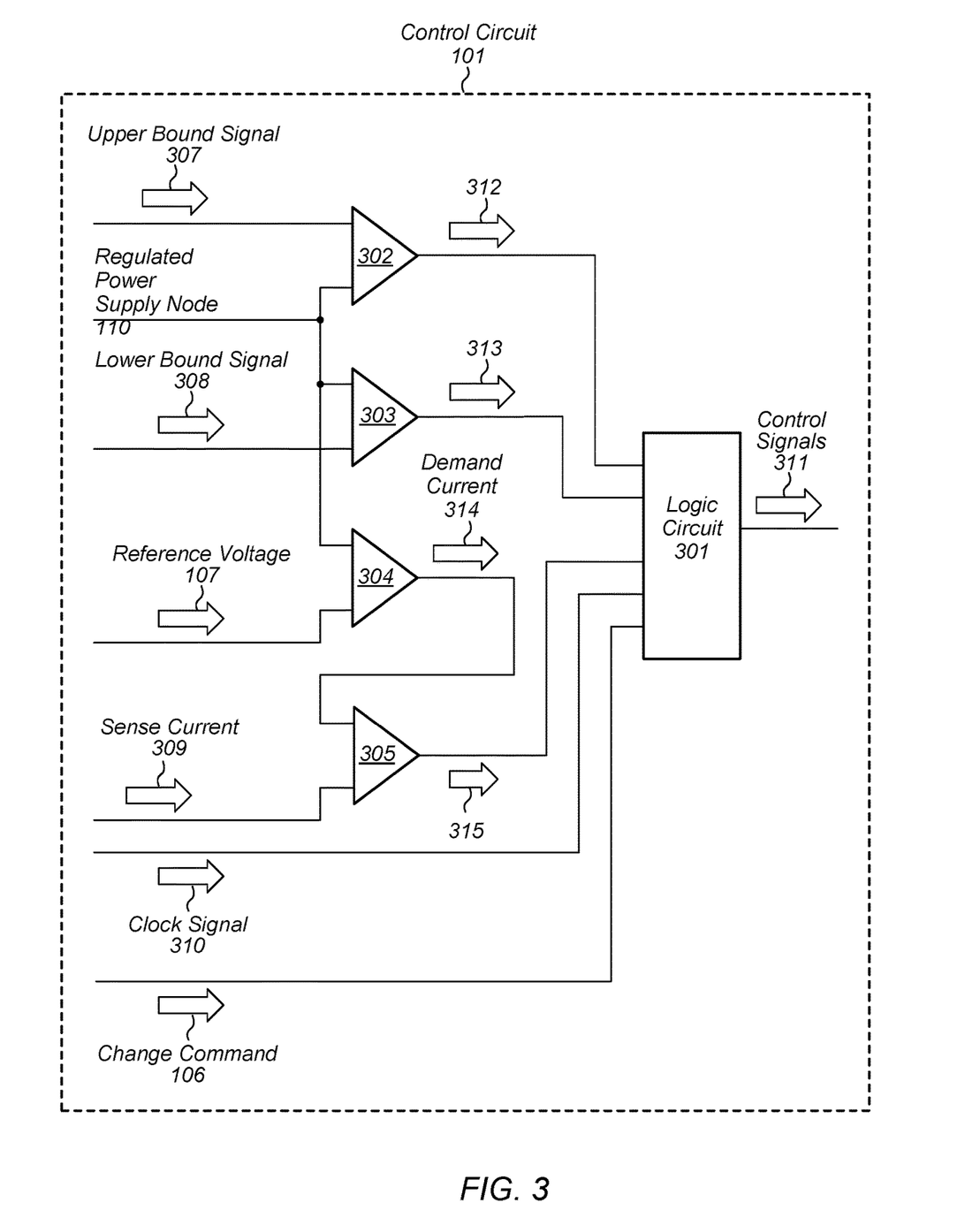
FIG. 3 illustrates a block diagram of an embodiment of a control circuit for a power converter circuit.

A block diagram of an embodiment of control circuit 101 is depicted in FIG. 3. As illustrated, control circuit 101 includes logic circuit 301, and comparator circuits 302-305.

Comparator circuit 302 is configured to generate signal 312 using upper bound signal 307 and the voltage level of regulated power supply node 110. In various embodiments, comparator circuit 302 may be an embodiment of a differential amplifier circuit configured to compare the respective voltage levels of upper bound signal 307 and regulated power supply node 110. For example, in response to a determination that the voltage level of regulated power supply node 110 is greater than upper bound signal 307, comparator circuit 302 may be configured to transition signal 312 from a low logic level to a high logic level.

Comparator circuit 303 is configured to generate signal 313 using lower bound signal 308 and the voltage level of regulated power supply node 110. In various embodiments, comparator circuit 303 may be an embodiment of a differential amplifier circuit configured to compare the respective voltage levels of lower bound signal 308 and regulated power supply node 110. For example, in response to a determination that the voltage level of regulated power supply node 110 is less than lower bound signal 308, comparator circuit 303 may be configured to transition signal 313 from a low logic level to a high logic level.

In various embodiments, upper bound signal 307 and lower bound signal 308 may be decrease in voltage over a period of time, which may be specified in change command 106. In some cases, upper bound signal 307 and lower bound signal 308 may track a change in reference voltage 107. For example, at a given point in time, the voltage level of upper bound signal 307 may be greater than reference voltage 107 by a particular value, and the voltage level of lower bound signal 308 may be less than reference voltage 107 by a different value. Upper bound signal 307 and lower bound signal 308 may be generated using various circuit techniques. For example, upper bound signal 307 and lower bound signal 308 may be generated by pre-charging a capacitor to a particular voltage level, and then discharging the capacitor with a particular current to created a linear voltage ramp with a negative slope.

Comparator circuit 304 is configured to generate demand current 314 using the voltage level of regulated power supply node 110 and reference voltage 107. In various embodiments, comparator circuit 304 may be an embodiment of a transconductance amplifier circuit configured to generate demand current 314 such that a value of demand current 314 is proportional to a difference in the voltage levels of regulated power supply node 110 and reference voltage 107.

Comparator circuit 305 is configured to generate signal 315 using demand current 314 and sense current 309. In various embodiments, comparator circuit 305 may be an embodiment of a differential amplifier circuit configured to assert signal 315, in response to a determination that sense current is greater than demand current 314. In various embodiments, signal 315 may be used to start or stop on-times or off-times for particular ones of operating modes 109.

Logic circuit 301 may be a particular embodiment of a sequential logic circuit or state machine configured to generate control signals 311 using signal 312, signal 313, signal 315, clock signal 310, and change command 106. In various embodiments, logic circuit 301 may be an embodiment of a microcontroller or state machine configured to assert and de-assert particulars ones of control signals 311 based on the state of the aforementioned signals and a current operating mode of power converter circuit 100. For example, in response to an assertion of change command 106, logic circuit 301 may be configured to use signal 312 and signal 313 to switch operating modes in response to determining the voltage level of regulated power supply node 110 is outside of a voltage range defined by upper bound signal 307 and lower bound signal 308.

In some cases, control circuit 101 is also configured to switch to different ones of operating modes 109 after particular time periods have elapsed. For example, if control circuit 101 has detected an over-voltage or under-voltage condition, and the voltage of the regulated power supply node 110 remains in the over-voltage or under-voltage condition after a change in operating mode, control circuit 101 is configured to switch to a higher power state operating mode after a particular time period has elapsed. In some cases, control circuit 101 may be configured to continue to switching the operating mode of power converter circuit 100 after the particular time period has elapsed multiple times. Control circuit 101 may be configured to use clock signal 310 to measure the particular time period. It is noted that in some embodiments, the particular time period may be programmable.

It is noted that the embodiment depicted in FIG. 3 is merely an example. In other embodiments, control circuit 101 may include additional comparator circuits used to implement other ones of operating modes 109. Such comparator circuits have been omitted from the embodiment depicted in FIG. 3 for clarity.

As used herein, activation (also referred to herein as assertion) of a signal refers to transitioning the signal to a logic value that enables a particular circuit or action coupled to the signal. In various embodiments, activation of a signal can be transition of the signal to a high or logical-1 value. In such cases, the signal is referred to as being "active high." Alternatively, activation of a signal can be a transition of the signal to a low or logical-0 value (referred to as being "active low").

Figure 4:
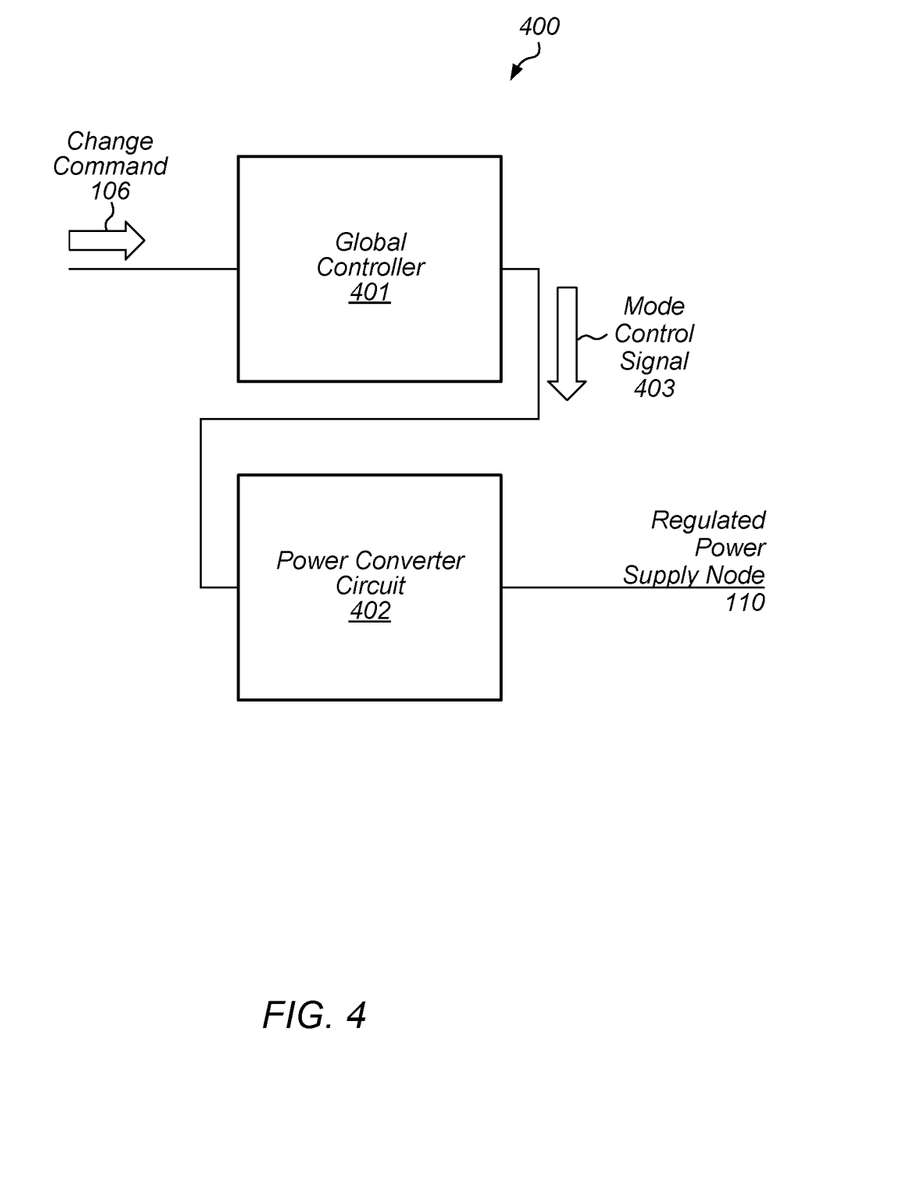
FIG. 4 illustrates a block diagram of an embodiment power converter subsystem.

Turning to FIG. 4, a block diagram of an embodiment of a power converter subsystem is depicted. As illustrated, power converter subsystem 400 includes global controller 401 and power converter circuit 402. In various embodiments, power converter circuit 402 may correspond to power converter circuit 100 as depicted in FIG. 1. It is noted that although a single power converter circuit is depicted in the embodiment illustrated in FIG. 4, in other embodiments, global controller 401 may control any suitable number of power converter circuits.

Global controller 401 is configured to receive change command 106. As noted above, change command 106 may include information indicative of a new target voltage level for regulated power supply node 110, as well as information indicative of a time for the voltage level of regulated power supply node 110 to transition from a current target voltage level to the new target voltage level. As described above the new target voltage level is less than the current voltage level of regulated power supply node 110. Global controller 401 is configured to generate mode control signal 403 using change command 106 and its included information. Mode control signal 403 may, in various embodiments, include information indicative of an operating mode (e.g., pulse frequency modulation mode) for power converter circuit 402.

In some cases, global controller 401 may select, based on the information included in change command 106, the operating mode from a list of available operating modes for power converter circuit 402. The list of available operating modes may be stored in a memory or other suitable storage circuit (not shown). In some embodiments, global controller 401 may use additional operating conditions or parameters (e.g., voltage level of input power supply node 212, temperature, etc.) to determine which of the available operating modes to select for the transition to the new target voltage level. Global controller 401 may be further configured to select a different operating mode once power converter circuit 402 has transitioned the voltage level of regulated power supply node 110 to the new target value, or after a particular time period has elapsed.

In various embodiments, global controller 401 may be an embodiment of a finite-state machine or other suitable sequential logic circuit. In other embodiments, global controller 401 may be an embodiment of a general-purpose processor configured to execute software or program instructions in order to generate mode control signal 403.

Power converter circuit 402 is configured to transition regulated power supply node 110 from a current voltage level to the new target voltage level, using an operating mode specified by mode control signal 403. In some cases, power converter circuit 402 may be configured to change a reference voltage level based on the new target voltage level for regulated power supply node 110 and the time specified in change command 106 over which the transition voltage level change is to occur. As the reference voltage level changes, power converter circuit 402 is configured to provide energy, in the form of current, to regulated power supply node 110 according the selected operating mode.

Figure 5:
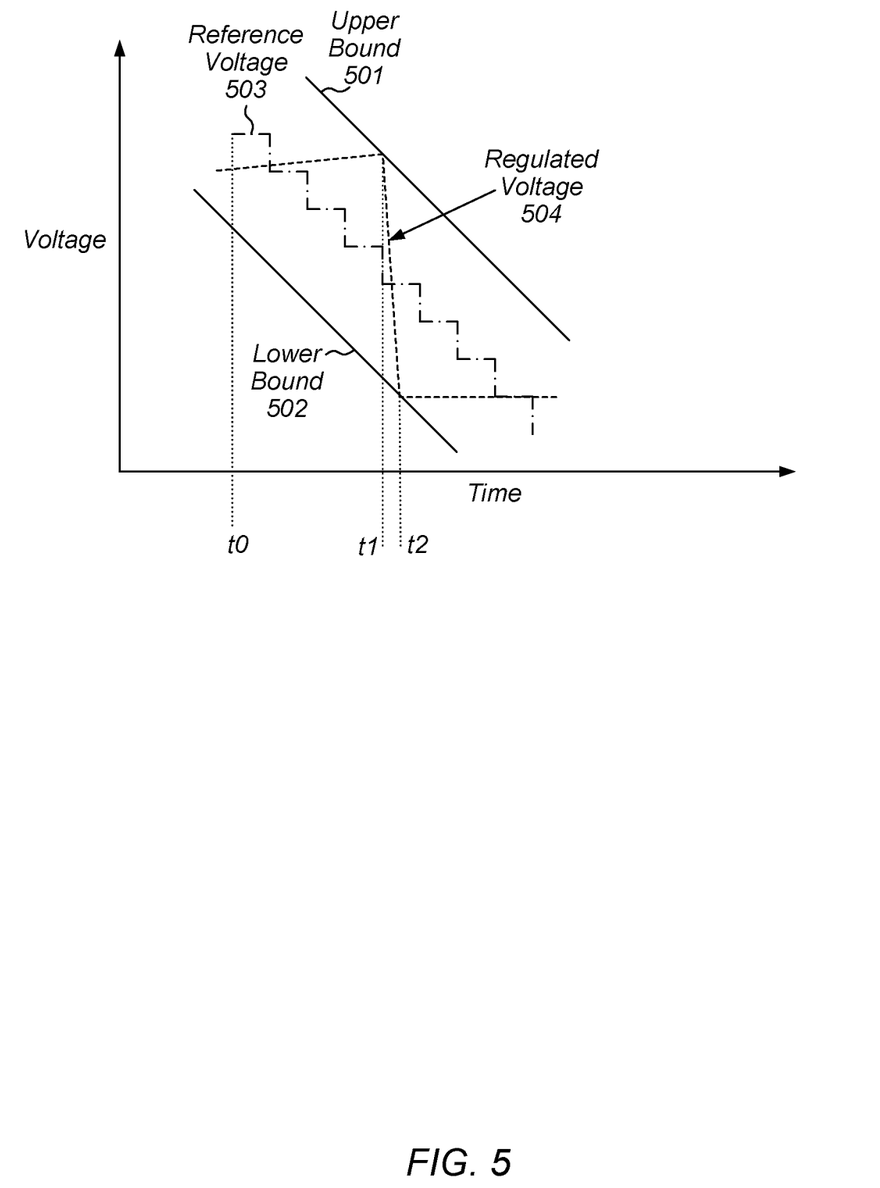
FIG. 5 illustrates example waveforms associated with the operation of a power converter circuit.

Example waveforms associated with the operation of a power converter circuit are depicted in FIG. 5. As illustrated, the waveforms depict a negative slew of regulated voltage 504. In various embodiments, regulated voltage 504 may correspond to a voltage level of regulated power supply node 110 as depicted in FIG. 1.

At time t0, reference voltage 503 (which may, in various embodiments, correspond to reference voltage 107), begins to transition to a new voltage level. As illustrated, reference voltage 503 steps down in particular increments over a period of time. It is noted that in other embodiments, reference voltage 503 may transition to the new voltage level in a more linear fashion.

As reference voltage 503 begins to decrease in value, upper bound 501 and lower bound 502 also begin to decrease in value. In various embodiments, upper bound 501 may correspond to upper bound signal 307, and lower bound 502 may correspond to lower bound signal 308. Upper bound 501 and lower bound 502 form limits for regulated voltage 504. As regulated voltage 504 exceeds either upper bound 501 or lower bounds 502, control circuit 101 may trigger a change in operating mode to adjust how regulated voltage 504 is decreasing.

At time t1, regulated voltage 504 exceeds upper bound 501 indicating that regulated voltage 504 is not discharging fast enough to meet specified negative slew rate targets. In response to this, control circuit 101 is configured to change the current operating mode of power converter circuit 100. For example, if power converter circuit 100 is operating in a pulse frequency modulation mode, control circuit 101 may switch the current operating mode to a pulse width modulation negative continuous conduction mode in order to pull more current away from the load during the off-time of power converter circuit 100.

At time t2, regulated voltage 504 is less than lower bound 502, indicating that regulated voltage 504 is discharging too fast to meet specified negative slew rate targets. To compensate for this situation, control circuit 101 makes another change to the current operating mode of power converter circuit 100. For example, power converter circuit 100 is operating in a pulse width modulation negative continuous conduction mode, control circuit 101 may switch the current operating mode to a pulse width modulation positive continuous conduction to allow switching circuit 102 additional time to source more charge to switch node 105.

Although only two operating mode changes are depicted in FIG. 5, in other embodiments, any suitable number of operating mode changes may occur. It is noted that the waveforms depicted in FIG. 5 are examples. In other embodiments, the waveforms may appear different due to differences in input supply voltage levels, load capacitances, semiconductor technology used to fabricate power converter circuit 100, and the like.

Figure 6:
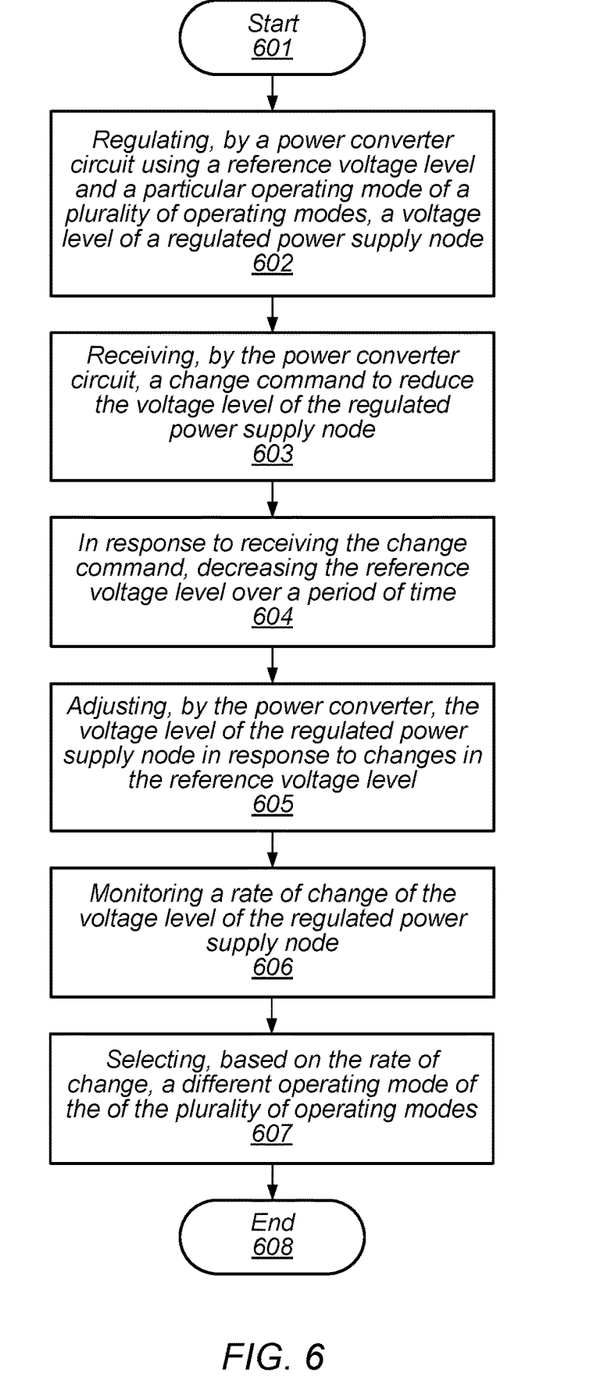
FIG. 6 illustrates a flow diagram of an embodiment of a method for operating a power converter circuit.

Turning to FIG. 6, a flow diagram depicting an embodiment of a method for operating a power converter circuit is illustrated. The method, which may be applied to power converter circuit 100 as depicted in FIG. 1, begins in block 601.

The method includes regulating, by a power converter circuit using a reference voltage level and a particular operating mode of a plurality of operating modes, a voltage level of a regulated power supply node (block 602). In some embodiments, regulating the voltage level of the regulated power supply node includes generating a demand current using the voltage level of the regulated power supply node and the reference voltage level, and comparing the demand current to a current flowing through the inductor.

The method also includes receiving, by the power converter circuit, a change command to reduce the voltage level of the regulated power supply node (block 603). In various embodiments, the change command may include information indicative of a new target voltage for the regulated power supply node, as well as a time period for the transition of the voltage level for the regulated power supply node from a current value to the new target value.

The method further includes, in response to receiving the change command, decreasing the reference voltage level over a period of time (block 604). In various embodiments, the reference voltage level is decremented in steps by a particular amount over the period of time.

The method also includes adjusting, by the power converter circuit, the voltage level of the regulated power supply node in response to changes in the reference voltage level (block 605). In some cases, adjusting the voltage level of the regulated power supply node includes reducing a time associated with an on-state of the power converter, or increasing a time associated with an off-state of the power converter.

The method further includes monitoring a rate of change of the voltage level of the regulated power supply node (block 606). In various embodiments, monitoring the rate of change includes comparing the voltage level of the regulated power supply node to an upper bound, and comparing the voltage level of the regulated power supply node to a lower bound.

The method also includes selecting, based on the rate of change, a different operating mode of the plurality of operating modes (block 607). In various embodiments, selecting the different operating mode includes, in response to determining the rate of change of the voltage level of the regulated power supply node exceeds a first threshold value, a first operating mode. In such cases, the power converter circuit is configured, while operating in the first operating mode, to draw more current from a load circuit during an off-state than while operating in the particular operating mode.

In other embodiments, selecting the different operating mode includes selecting, in response to determining the rate of change of the voltage level of the regulated power supply node is less than a second threshold value, a second operating mode. In such cases, the power converter circuit may be configured, while operating in the second operating mode, to source more charge to a load circuit during an on-state than while operating in the particular operating mode. The method concludes in block 608.

Figure 7:
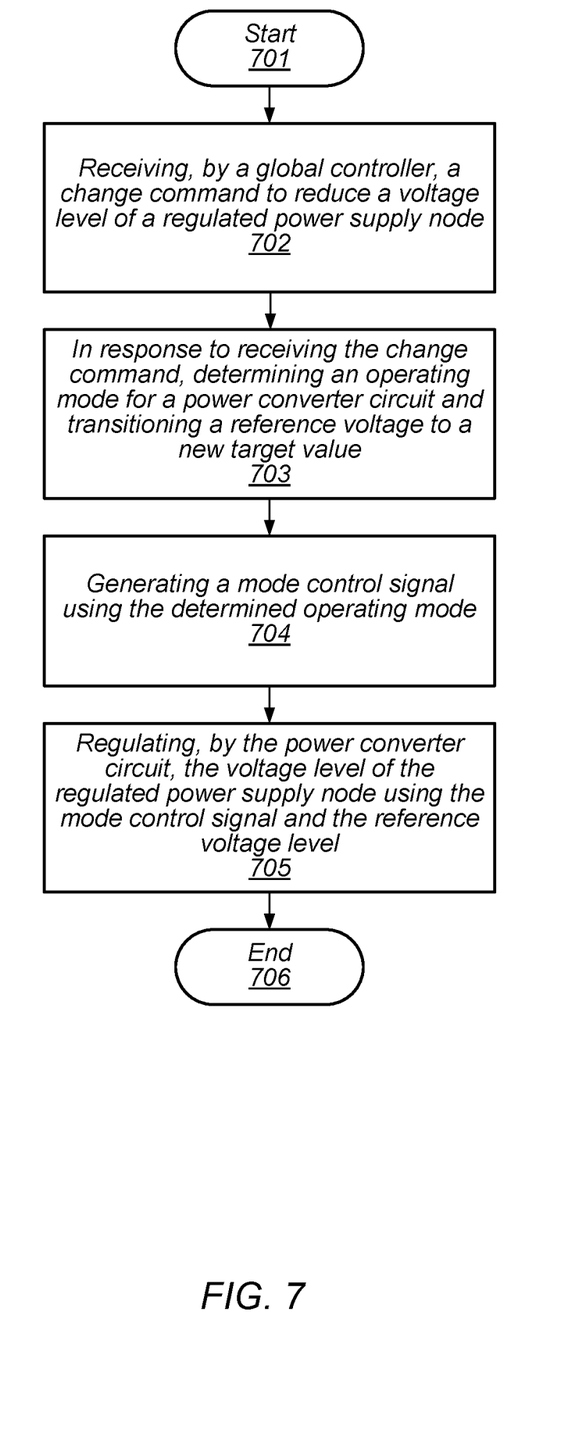
FIG. 7 illustrates a flow diagram depicting another embodiment of a method for operating a power converter circuit.

As described above, some computer systems may employ a global controller that is configured to select an operating mode for a power converter during negative slew rate operation. A flow diagram illustrating an embodiment of a method for operating a power converter subsystem is depicted in FIG. 7. The method, which may be applied to power converter subsystem 400 as depicted in FIG. 4, begins in block 701.

The method includes receiving, by a global controller, a change command to reduce a voltage level of a regulated power supply node (block 702). In various embodiments, the change command may include information indicative of a new target voltage for the regulated power supply node, as well as a time period for the transition of the voltage level for the regulated power supply node from a current value to the new target value.

The method also includes, in response to receiving the charge command, determining an operating mode for a power converter circuit and transitioning a reference voltage to a new target value (block 703). In various embodiments, determining an operating mode for the power converter circuit may include checking a current operating mode for the power converter circuit, as well as other operating conditions (e.g., temperature, voltage level of an input power supply node for the power converter, etc.).

The method further includes generating a mode control signal using the determined operating mode (block 704). In various embodiments, the mode control signal may include information indicative of an operating mode (e.g., pulse width modulation) to which the power converter is to switch. In some cases, the mode control signal may additionally include information indicative of a new target voltage level for the regulated power supply node, as well a slew rate for the transition to the new target voltage level.

The method also includes regulating, by the power converter circuit, the voltage level of the regulated power supply node using the mode control signal and the reference voltage level (block 705). In various embodiments, regulating the voltage level of the regulated power supply node may include generating a demand current using the voltage level of the regulated power supply node and the reference voltage level, and comparing the demand current to a current flowing through an inductor in the power converter circuit that is coupled to the regulated power supply node. The method concludes in block 706.

Figure 8:
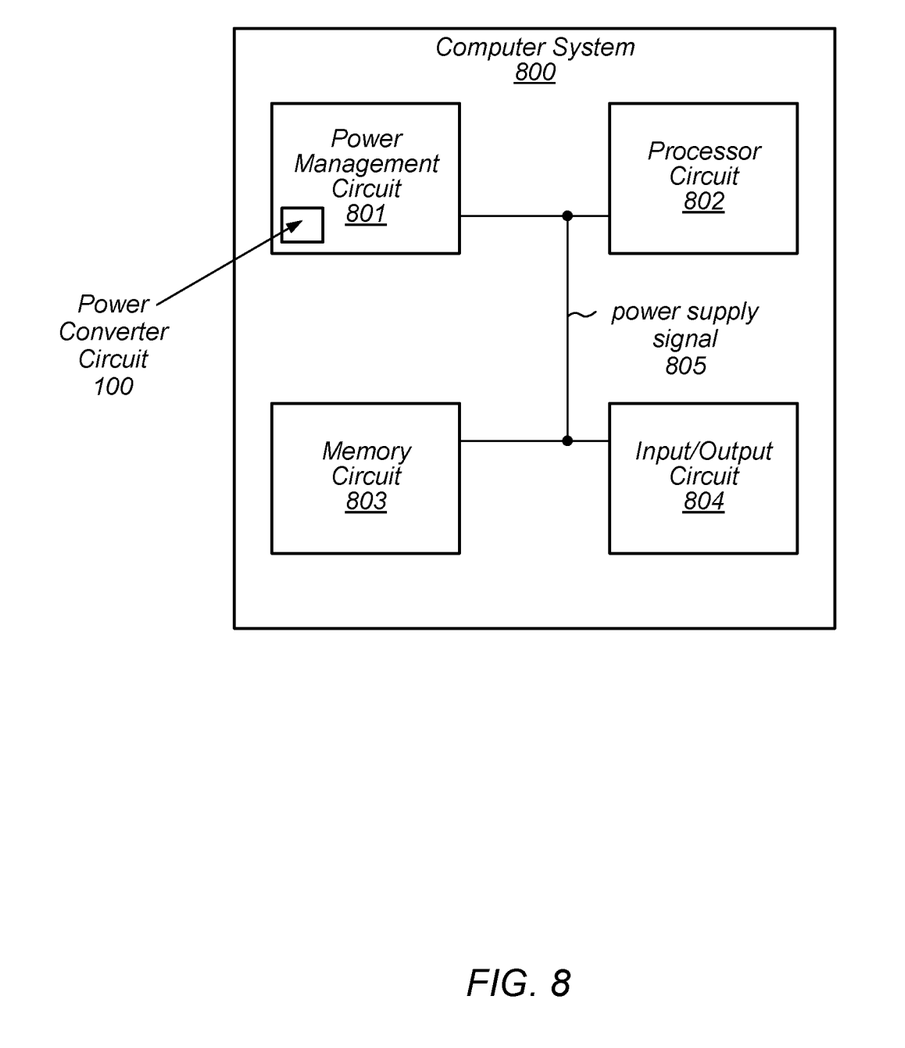
FIG. 8 depicts a block diagram of a computer system.

A block diagram of computer system is illustrated in FIG. 8. In the illustrated embodiment, the computer system 800 includes power management circuit 801, processor circuit 802, memory circuit 803, and input/output circuits 804, each of which is coupled to power supply signal 805. In various embodiments, computer system 800 may be a system-on-a-chip (SoC) and/or be configured for use in a desktop computer, server, or in a mobile computing application such as, e.g., a tablet, laptop computer, or wearable computing device.

Power management circuit 801 includes power converter circuit 100 which is configured to generate a regulated voltage level on power supply signal 805 in order to provide power to processor circuit 802, memory circuit 803, and input/output circuits 804. Although power management circuit 801 is depicted as including a single power converter circuit, in other embodiments, any suitable number of power converter circuits may be included in power management circuit 801, each configured to generate a regulated voltage level on a respective one of multiple internal power supply signals included in computer system 800. In cases where multiple power converter circuits are employed, two or more of the multiple power converter circuits may be connected to a common set of power terminals that connections to power supply signals and ground supply signals of computer system 800.

Processor circuit 802 may, in various embodiments, be representative of a general-purpose processor that performs computational operations. For example, processor circuit 802 may be a central processing unit (CPU) such as a microprocessor, a microcontroller, an application-specific integrated circuit (ASIC), or a field-programmable gate array (FPGA).

Memory circuit 803 may in various embodiments, include any suitable type of memory such as a Dynamic Random-Access Memory (DRAM), a Static Random-Access Memory (SRAM), a Read-Only Memory (ROM), Electrically Erasable Programmable Read-only Memory (EEPROM), or a non-volatile memory, for example. It is noted that although in a single memory circuit is illustrated in FIG. 8, in other embodiments, any suitable number of memory circuits may be employed.

Input/output circuits 804 may be configured to coordinate data transfer between computer system 800 and one or more peripheral devices. Such peripheral devices may include, without limitation, storage devices (e.g., magnetic or optical media-based storage devices including hard drives, tape drives, CD drives, DVD drives, etc.), audio processing subsystems, or any other suitable type of peripheral devices. In some embodiments, input/output circuits 804 may be configured to implement a version of Universal Serial Bus (USB) protocol or IEEE 1394 (Firewire®) protocol.

Input/output circuits 804 may also be configured to coordinate data transfer between computer system 800 and one or more devices (e.g., other computing systems or integrated circuits) coupled to computer system 800 via a network. In one embodiment, input/output circuits 804 may be configured to perform the data processing necessary to implement an Ethernet (IEEE 802.3) networking standard such as Gigabit Ethernet or 10-Gigabit Ethernet, for example, although it is contemplated that any suitable networking standard may be implemented. In some embodiments, input/output circuits 804 may be configured to implement multiple discrete network interface ports.

Although specific embodiments have been described above, these embodiments are not intended to limit the scope of the present disclosure, even where only a single embodiment is described with respect to a particular feature. Examples of features provided in the disclosure are intended to be illustrative rather than restrictive unless stated otherwise. The above description is intended to cover such alternatives, modifications, and equivalents as would be apparent to a person skilled in the art having the benefit of this disclosure.

The scope of the present disclosure includes any feature or combination of features disclosed herein (either explicitly or implicitly), or any generalization thereof, whether or not it mitigates any or all of the problems addressed herein. Accordingly, new claims may be formulated during prosecution of this application (or an application claiming priority thereto) to any such combination of features. In particular, with reference to the appended claims, features from dependent claims may be combined with those of the independent claims and features from respective independent claims may be combined in any appropriate manner and not merely in the specific combinations enumerated in the appended claims.

What is claimed is:

1. An apparatus, comprising:
   a switching circuit that includes a switch node coupled to a regulated power supply node via an inductor, wherein the switching circuit is configured to source charge to the switch node when activated; and
   a control circuit configured to:
      activate the switch circuit based on a reference voltage level and a current operating mode, wherein the current operating mode is a particular operating mode of a plurality of operating modes;
      in response to receiving a change command to reduce a voltage level of the regulated power supply node:
         initiate a change in the reference voltage level;
         monitor a slew rate of the voltage level of the regulated power supply node; and
         change, based on the slew rate, the current operating mode to a different operating mode of the plurality of operating modes.

2. The apparatus of claim 1, wherein the change command includes information indicative of a new voltage level for the regulated power supply node and a time period for the voltage level of the regulated power supply node to transition from a current voltage level to the new voltage level.

3. The apparatus of claim 1, wherein to monitor the slew rate of the voltage level of the regulated power supply node, the control circuit is further configured to:
   compare the voltage level of the regulated power supply node to an upper bound; and
   compare the voltage level of the regulated power supply node to a lower bound.

4. The apparatus of claim 3, wherein to change the current operating mode, the control circuit is further configured to select a different operating mode of the plurality of operating modes in response to a determination that the voltage level of the regulated power supply node is greater than the upper bound, wherein the switching circuit is further configured, while operating in the different operating mode, to draw more current from a load circuit during an off-state than while operating in the particular operating mode.

5. The apparatus of claim 3, wherein to change the current operating mode, the control circuit is further configured to select a different operating mode of the plurality of operating modes in response to a determination that the voltage level of the regulated power supply node is less than the lower bound, wherein the switching circuit is further configured, while operating in the different operating mode, to source more charge to a load circuit during an on-state than while operating in the particular operating mode.

6. The apparatus of claim 1, wherein to activate the switching circuit, the control circuit is further configured to:
generate a demand current using the voltage level of the regulated power supply node and the reference voltage level; and
compare the demand current to a current flowing through the inductor.

7. A method, comprising:
regulating, by a power converter circuit using a reference voltage level and a particular operating mode of a plurality of operating modes, a voltage level of a regulated power supply node, wherein the power converter circuit is coupled to the regulated power supply node via an inductor;
receiving, by the power converter circuit, a change command to reduce the voltage level of the regulated power supply node;
in response to receiving the change command, decreasing the reference voltage level over a period of time;
adjusting, by the power converter circuit, the voltage level of the regulated power supply node in response to changes in the reference voltage level;
monitoring a rate of change of the voltage level of the regulated power supply node; and
selecting, based on the rate of change, a different operating mode of the plurality of operating modes.

8. The method of claim 7, wherein the change command includes information indicative of a new target voltage level for the regulated power supply node and a time period for the voltage level of the regulated power supply node to transition from a current voltage level to the new target voltage level.

9. The method of claim 7, wherein selecting the different operating mode of the plurality of operating modes includes selecting, in response to determining the rate of change of the voltage level of the regulated power supply node exceeds a first threshold value, a first operating mode, wherein the power converter circuit is configured, while operating in the first operating mode, to draw more current from a load circuit during an off-state than while operating in the particular operating mode.

10. The method of claim 9, wherein selecting the different operating mode of the plurality of operating modes includes selecting, in response to determining the rate of change of the voltage level of the regulated power supply node is less than a second threshold value, a second operating mode, wherein the power converter circuit is configured, while operating in the second operating mode, to source more charge to the load circuit during an on-state than while operating in the particular operating mode.

11. The method of claim 10, further comprising, re-selecting the particular operating mode in response to determining the rate of change of the voltage level of the regulated power supply node is between the first threshold value and the second threshold value.

12. The method of claim 7, wherein monitoring the rate of change of the voltage level of the regulated power supply node includes:
comparing the voltage level of the regulated power supply node to an upper bound; and
comparing the voltage level of the regulated power supply node to a lower bound.

13. The method of claim 7, wherein regulating the voltage level of the regulated power supply node includes:
generating a demand current using the voltage level of the regulated power supply node and the reference voltage level; and
comparing the demand current to a current flowing through the inductor.

14. An apparatus, comprising:
a load circuit coupled to a regulated power supply node; and
a power converter circuit configured to:
regulate a voltage level of a regulated power supply node using a reference voltage level and a particular operating mode of a plurality of operating modes;
in response to receiving a change command to reduce the voltage level of the regulated power supply node, reduce the reference voltage level over a period of time;
adjust the voltage level of the regulated power supply node in response to changes in the reference voltage level;
monitor a rate of change of the voltage level of the regulated power supply node; and
select, based on the rate of change, a different operating mode of the plurality of operating modes.

15. The apparatus of claim 14, wherein the change command includes information indicative of a new target voltage level for the regulated power supply node and a time period for the voltage level of the regulated power supply node to transition from a current voltage level to the new target voltage level.

16. The apparatus of claim 14, wherein to select the different operating mode, the power converter circuit is further configured to select, in response to a determination that the rate of change of the voltage level of the regulated power supply node exceeds a first threshold value, a first operating mode, wherein the power converter circuit is further configured, while operating in the first operating mode, to draw more current from a load circuit during an off-state than while operating in the particular operating mode.

17. The apparatus of claim 16, wherein to select the different operating mode, the power converter circuit is further configured to select, in response to a determination that the rate of change of the voltage level of the regulated power supply node is less than a second threshold value, a second operating mode, wherein the power converter circuit is further configured, while operating in the second operating mode, to source more charge to the load circuit during an on-state than while operating in the particular operating mode.

18. The apparatus of claim 17, wherein the power converter circuit is further configured to select a third operating mode, in response to a determination that the rate of change of the voltage level of the regulated power supply node continues to exceed the first threshold value after a particular time period has elapsed.

19. The apparatus of claim 14, wherein to monitor the rate of change of the voltage level of the regulated power supply node, the power converter circuit is further configured to:
compare the voltage level of the regulated power supply node to an upper bound; and
compare the voltage level of the regulated power supply node to a lower bound.

20. The apparatus of claim 14, wherein to regulate the voltage level of the regulated power supply node, the power converter circuit is further configured to:

generate a demand current using the voltage level of the regulated power supply node and the reference voltage level; and compare the demand current to an output current of the power converter circuit.

\* \* \* \* \*